United States Patent [19]
Shih et al.

[11] Patent Number: 5,362,815
[45] Date of Patent: Nov. 8, 1994

[54] PROCESS FOR MAKING POLYVINYLPYRROLIDONE POLYMER HAVING PREDETERMINED CHARACTERISTICS

[75] Inventors: Jenn S. Shih, Paramus; Jui-Chang Chuang, Wayne; Robert B. Login, Oakland, all of N.J.

[73] Assignee: ISP Investments Inc., Wilmington, Del.

[21] Appl. No.: 54,576

[22] Filed: Apr. 26, 1993

[51] Int. Cl.$^5$ .................... C08F 126/10; C08F 2/04
[52] U.S. Cl. ............................. 525/326.9; 526/212
[58] Field of Search .................. 526/212; 525/326.9

[56] References Cited
U.S. PATENT DOCUMENTS
4,520,180 5/1985 Barabas et al. .................. 526/212

Primary Examiner—Joseph L. Schofer
Assistant Examiner—Wu C. Cheng
Attorney, Agent, or Firm—Walter Katz; Marilyn J. Maue; Joshua J. Ward

[57] ABSTRACT

A process for making a solution of PVP K-90 polymer having a weight average molecular weight, Mw, of about 630,000 to 750,000 and a molecular weight distribution, Mw/Mn, where Mn is the number average molecular weight of the polymer, of 5 or less, which comprises free radical polymerizing about 5-30% by weight vinylpyrrolidone, preferably 10-20%, at about 40°-100° C., preferably 60°-75° C., in an aqueous-alcohol solvent selected from the group consisting of about (a) 5% isopropanol-95% water, (b) 10% ethanol-90% water and (c) 20% methanol-80% water.

6 Claims, No Drawings

PROCESS FOR MAKING POLYVINYLPYRROLIDONE POLYMER HAVING PREDETERMINED CHARACTERISTICS

BACKGROUND OF THE INVENTION

1. Field of the Invention

This invention relates to polymerization of vinylpyrrolidone (VP) to form polyvinylpyrrolidone (PVP), and, more particularly, to a process for making PVP having both a predetermined high molecular weight (Mw) (K-90, Mw=650,000) and a low molecular weight distribution (MWD=Mw/Mn=5 or less), and, most preferably, a low residual VP level of <0.1%.

2. Description of the Prior Art

Polymerization of vinylpyrrolidone (VP) by free radical mechanisms to form polyvinylpyrrolidone (PVP) is well known and described in U.S. Pat. Nos. 3,862,915; 4,053,693; 4,058,655; and 4,554,312. In the latter patent, Barabas and Cho disclosed a process for making PVP by polymerizing VP in the presence of t-butylperoxypivalate as a free radical initiator. The solvent employed was water, a mixture of water and isopropyl alcohol, or sec. butyl alcohol, or both. In water alone (Example 1) the PVP product had a K-value of 91.1; however, the MWD, or molecular weight distribution of the PVP product made in water is very high, i.e. about 7, which adversely affects its viscosity and other properties. In a mixture of water and 8.7% isopropanol, (Example 2) the K-value of PVP was only 63.1, corresponding to a low Mw of about 400,000 although the MWD decreased to about 5. A 50% isopropanol-50% water solvent mixture (Example 3) gave a low K-value of 41.8. Similarly, in isopropanol solvent alone, the K-value was 30.5 (Example 4), or 12.2 (Example 5). Accordingly, none of these process conditions provided a PVP product having a K-value of 90 corresponding to a Mw of 650,000 and a MWD of 5 or less, and, most preferably, a low residual VP level of <0.1%.

Accordingly, an object of this invention is to provide a process for preparing PVP having a K-value of 90 corresponding to a Mw of about 650,000, and a MWD of 5 or less, wherein the polymer has polymer chains therein which have more nearly about the same length, and, most preferably, in the form of a solution or powder with a residual vinylpyrrolidone level of <0.1%.

These and other objects and features of the invention will be made apparent from the following description of the invention.

DESCRIPTION OF THE INVENTION

What is provided herein is a process for making PVP K-90 polymer, in the form of a solution or powder, having a weight average molecular weight, Mw, of about 630,000 to 750,000, usually about 650,000, and a molecular weight distribution, Mw/Mn, where Mn is the number average molecular weight of the polymer, of 5 or less, which comprises free radical polymerizing about 5–30%, preferably 10–20% by weight vinylpyrrolidone at about 40°–100° C., preferably 60°–75° C., in an aqueous-alcohol solvent selected from the group consisting of (a) 5% isopropanol-95% water, (b) 10% ethanol-90% water and (c) 20% methanol-80% water, and, most preferably, in the form of a solution, which may be dried to a powder having less than 0.1% residual vinylpyrrolidone therein.

The process of the invention further includes the preferred steps of:

(i) removing the alcohol from the polymer solution under vacuum at low temperatures, preferably about 40° C. or less, and (ii) hydrolyzing residual vinylpyrrolidone therein at a pH of <3 to a level of <0.1%.

The PVP polymer product may be provided in the form of a powder by increasing the pH of the polymer solution to about 7 and freeze-drying the solution.

The invention will be described in more detail by the following working examples of the invention.

EXAMPLES 1–3

In a 1-liter resin kettle equipped with a condenser, a nitrogen purge tube, a thermocouple connected to the temperature controller, and a mechanical stirrer, N-vinyl pyrrolidone, alcohol (methanol, ethanol, or isopropanol) (See Table I) and water were charged in predetermined amounts and the solution (20% VP monomer) was adjusted to pH 9.5 by adding sodium bicarbonate. The solution was heated to 70° C. with a nitrogen purge maintained during the process. The reactor then was held at that temperature for another 30 minutes and 0.2% 2,2′-azobis(methylbutyronitrile) VAZO 67 initiator dissolved in 1 ml N-vinyl-pyrrolidone was added into the reactor. The reaction exotherm was controlled by a cooling water bath during addition of the initiator solution and thereafter. When the residual vinylpyrrolidone content in the polymer product reached a level of 0.5%, the nitrogen stream was removed and replaced with an air stream. Then the reactor was cooled down to 40° C. The alcohol solvent then was removed under vacuum at 40° C. Some water was added to keep the polymer solution at the same initial percent solids. The resultant solution then was adjusted to a pH of 3 by adding concentrated hydrochloric acid. The acidic solution was stirred overnight, and made neutral to a pH of 7 by adding ammonium hydroxide solution. The neutral solution was then freeze-dried to provide the polymer in a powder form.

The properties of the polymer product obtained are given in the Table below. The molecular weights and molecular weight distribution (polydispersity) of PVP was determined by GPC under the following conditions:

GPC CONDITIONS

Temperature=30° C.
Flow rate=0.5 ml/min.
Calibration=PED (polyethylene oxide)
Column=Shodex KB 80M
Run Time=30 minutes
Injection Volume=50 μl
Concentration=0.15%
Mobile Phase=20% methanol/aqueous 0.1 NLiNO$_3$

TABLE

INVENTION EXAMPLES

| EX. NO. | AQUEOUS-ALCOHOL SOLVENT | ALCOHOL-AMOUNT (%) | WATER-AMOUNT (%) | K-90 PVP PRODUCT | | RESIDUAL VP (%) |
|---|---|---|---|---|---|---|
| | | | | Mw | MWD | |
| 1 | Isoropanol | 5 | 95 | 632,000 | 5.0 | 0.05 |
| 2 | Ethanol | 10 | 90 | 672,500 | 4.8 | 0.05 |
| 3 | Methanol | 20 | 80 | 753,000 | 4.9 | 0.05 |

COMPARATIVE RUNS OF EXAMPLES 1-3

Comparative runs were carried out for Examples 1-3 with the same aqueous-alcoholic solvents as given in Table I above, however, at different concentrations of each alcohol. At an isopropanol level of 10%, the Mw of the polymer obtained was only 386,000. At ethanol levels of 15% and 20%, the Mw of the polymer was only 570,000 and 420,000 respectively. At methanol levels of 10% and 5%, the Mw of the polymer increased to 995,000 and 1,070,000 and the MWD increased to 5.4 and 5.6, respectively.

While the invention has been described with particular reference to certain embodiments thereof, it will be understood that changes and modifications may be made which are within the skill of the art. Accordingly, it is intended to be bound only by the following claims, in which:

What is claimed is:

1. A process for making a solution of PVP K-90 polymer having a weight average molecular weight, Mw, of about 630,000 to 750,000 and a molecular weight distribution, Mw/Mn, where Mn is the number average molecular weight of the polymer, of 5 or less, which comprises free radical polymerizing about 5-30% by weight vinylpyrrolidone at about 40°-100° C. in an aqueous-alcohol solvent selected from the group consisting of about (a) 5% isopropanol-95% water, (b) 10% ethanol-90% water and (c) 20% methanol-80% water, wherein said PVP polymer has a residual vinylpyrrolidone level of <0.1% therein.

2. A process according to claim 1 including the steps of:
   (i) removing the alcohol solvent from the solution under vacuum at a temperature of about 40° C. or less, and
   (ii) hydrolyzing residual vinylpyrrolidone therein at a pH of <3 to a level of <0.1%.

3. A process according to claim 1 for making said PVP in the form of a powder further including the steps of increasing the pH to about 7 and freeze-drying the solution.

4. A process according to claim 1 wherein said aqueous-alcohol solvent is 5% isopropanol-95% water.

5. A process according to claim 1 wherein said aqueous-alcohol solvent is 10% ethanol-90% water.

6. A process according to claim 1 wherein said aqueous-alcohol solvent is 20% methanol-80% water.

* * * * *